Nov. 24, 1942.                H. F. MALONE                 2,303,216
                               INDICATOR
                          Filed June 30, 1937          4 Sheets-Sheet 1

Nov. 24, 1942.       H. F. MALONE        2,303,216
INDICATOR
Filed June 30, 1937        4 Sheets-Sheet 2

Inventor
Homer F. Malone
By Williams, Bradbury, McCaleb & Hinkle
Attys

Nov. 24, 1942.   H. F. MALONE   2,303,216
INDICATOR
Filed June 30, 1937   4 Sheets-Sheet 3

Inventor:
Homer F. Malone
By
Williams, Bradbury, McCaleb & Hinkle
Attys

Nov. 24, 1942. H. F. MALONE 2,303,216
INDICATOR
Filed June 30, 1937 4 Sheets-Sheet 4

Inventor:
Homer F. Malone
By Williams, Bradbury McCaleb & Hinkle
Attys.

Patented Nov. 24, 1942

2,303,216

UNITED STATES PATENT OFFICE 2,303,216

INDICATOR

Homer F. Malone, Chicago, Ill., assignor to Stewart-Warner Corporation, Chicago, Ill., a corporation of Virginia Application June 30, 1937, Serial No. 151,296

17 Claims. (Cl. 171—95)

My invention relates to indicators and is more particularly concerned with the provision of an electrical indicator especially designed for use on automotive vehicles to indicate the quantity of gasolene in the main gasolene tank, the engine temperature, the pressure existing in the engine oiling system, the voltage of the electrical system, and similar items of interest to the driver of the automobile.

An object of my invention is to provide an improved indicator which is perfectly compensated for variations in ambient temperature.

Another object of my invention is to provide an indicator which is perfectly compensated for variations in the effective voltage of the automobile electrical system.

Another object is to provide an improved indicator which is positive and accurate under all conditions of operation.

Another object of my invention is to provide an improved indicator which may easily be calibrated and which will retain its calibration in spite of vibrations to which it may be subjected in use.

Another object of my invention is to provide an improved indicator which is simple, durable and compact and which may be inexpensively manufactured in the form of an instrument having an attractive appearance.

Another object of my invention is to provide an improved indicator which is capable of a wide variety of uses.

Other objects and advantages will become apparent as the description proceeds.

Referring to Figures 1 to 6 of the drawings, I have illustrated one embodiment of my invention as having a base 10 which is shown as being formed of a phenol condensation product but which may be of metal or other suitable material. A metal plate 12 is suitably secured to the base 10 as by means of screws 14 and a bracket 16 is pivotally secured to the plate 12 by a single screw 18. The bracket 16 has a pair of upstanding arms 20 carrying the bi-metallic strips 22 and 24. The other ends of these bi-metallic strips 22 and 24 are bent laterally as indicated most clearly in Figure 6 and are attached to and connected by a link 26 illustrated as being formed of a phenol condensation product but which may be of metal or other suitable material. The bracket 16 has an extension 28 lying in contact with the plate 12 and terminating in teeth 30 which are adapted to be engaged by a tool for pivoting the bracket 16 about the screw 18 to calibrate the instrument. The opening 124 permits the insertion of such a tool. The screw 18 holds the bracket 16 against the plate 12 with sufficient friction to prevent the bracket 16 from being shifted by any vibration to which the instrument may be subjected when mounted on an automobile or other vehicle.

Figure 6:
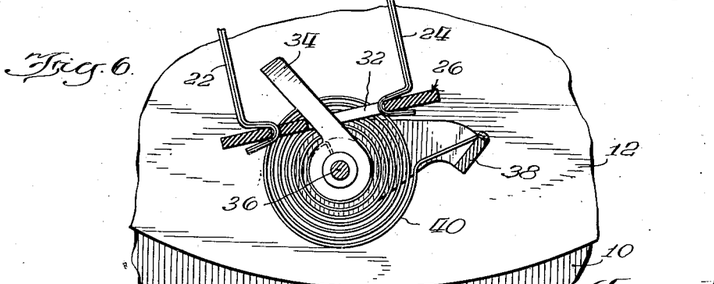
Figure 6 is a sectional view taken on the line 6—6 of Figure 5.

The link 26 has a slot 32 which receives an arm 34 rigidly attached to a shaft 36 pivotally supported in bearings provided by a yoke 38. A spiral spring 40 is connected to the shaft 36 and yoke 38 and holds the arm 34 at one extreme of the slot 32 as best shown in Figure 6.

Figures 1, 2:
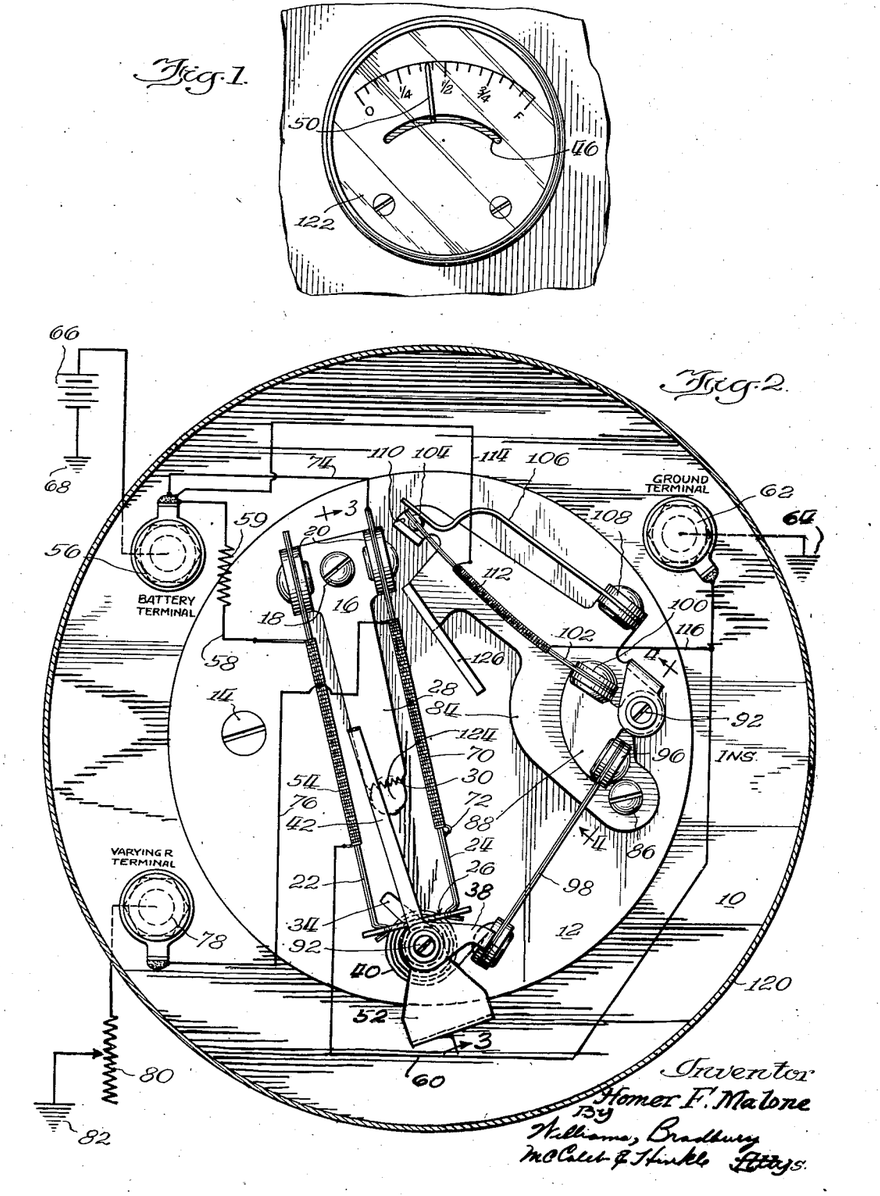
Figure 1 is a front elevation of an indicator embodying my invention showing it mounted on a support such as the instrument panel of an automobile.
Figure 2 is an enlarged section taken on a plane parallel to and just behind the dial. This figure diagrammatically shows the electrical connections of a typical circuit in which my improved indicator is adapted to be used.
Figure 3:
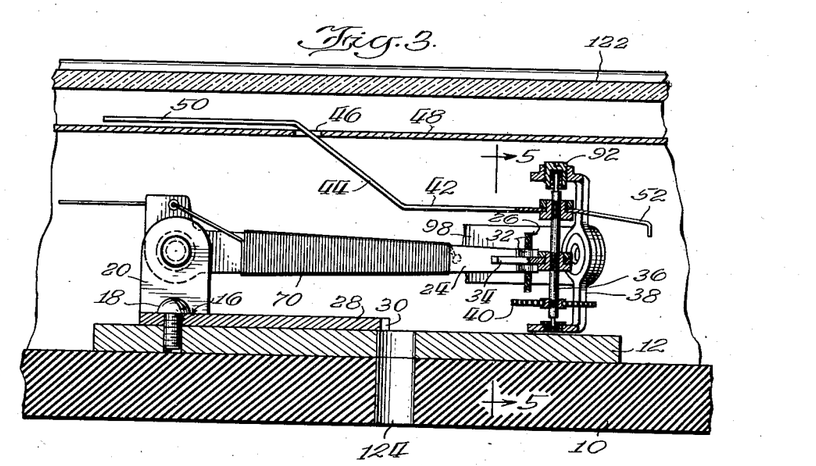
Figure 3 is a fragmentary section taken on the line 3—3 of Figure 2.
Figure 4:
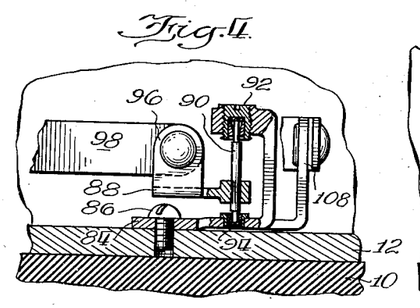
Figure 4 is another fragmentary section taken on the line 4—4 of Figure 2.
Figure 5:
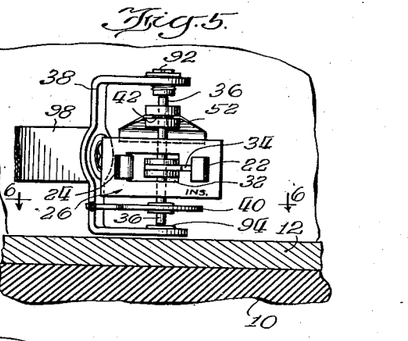
Figure 5 is a sectional view of a detail and is taken on the line 5—5 of Figure 3.

The shaft 36 carries a pointer 42 which is bent laterally as indicated at 44, Figure 3, to project through the slot 46 of a dial 48 which carries indicia suitable for the particular use to which my improved indicator is to be put. The free end 50 of the pointer preferably overlies this indicia as best shown in Figure 1. The opposite end 52 of the pointer 42 serves to balance the pointer about the shaft 36 as a center.

The bi-metallic strips 22 and 24 are so proportioned and arranged that any increase in the ambient temperature tends to bend these strips in opposite directions so that they exert equal and opposite forces on the link 26. This link 26 accordingly remains stationary and changes in ambient temperature do not affect the reading of the instrument.

A heating coil 54 surrounds the bi-metallic strip 22 and is electrically insulated therefrom. One end of this coil is connected to a terminal 56 by conductor 58 and resistance 59. A wire 60 connects the other end of the heating coil 54 to a second terminal 62. The terminals 56 and 62 are mounted directly on the insulating base 10, the terminal 62 being grounded as indicated at 64. The terminal 56 is adapted for connection to a source of electro-motive force such, for example, as the battery 66, which has one terminal grounded as indicated at 68.

A second heating coil 70 surrounds and is insulated from the bi-metallic strip 24. The end 72 of the heating coil 70 is electrically connected to the battery terminal 56 by way of the bi-metallic strip 24 and a wire 74, and a wire 76 connects the other end of the coil 70 with a third terminal 78 also mounted on the insulating base 10. The terminal 78 is connected to a variable rheostat indicated at 80, the other terminal of the rheostat being grounded as indicated at 82. The rheostat 80 may be of the type disclosed in my co-pending application, Serial No. 151,297, filed June 30, 1937, now Patent No. 2,243,807 of May 27, 1941, or of any other suitable type.

While my improved indicator is particularly adapted for automotive use, it is not limited to this use but is capable of widespread application. Where my improved indicator is used in connection with a source of electro-motive force 66 which gives a constant voltage, the yoke 38 may be directly secured to the plate 12 by any suitable means. In automotive practice, however, the generator driven by the automobile engine has a variable voltage depending upon the speed of the engine. Wherefore I have provided special means for compensating for this variable voltage of an automobile electrical system. I shall now describe this variable voltage compensating means.

A second bracket 84 is pivotally attached to the plate 12 by a screw 86, the screw 86 holding the bracket 84 against the plate 12 with sufficient friction to prevent accidental displacement of the bracket 84. A movable bracket 88 is pivotally mounted on the bracket 84 by means of a shaft 90 suitably supported in bearings 92 and 94 provided by the stationary bracket 84. This movable bracket 88 has a lug 96 supporting a strap 98 which in turn carries the yoke 38.

A second lug 100 provided by the movable bracket 88 is attached to one end of a bi-metallic strip 102 having a ball 104 at its opposite end. A spring 106 carried by the upstanding arm 108 of the bracket 84 presses the ball 104 into sliding engagement with the surface of lug 110 also provided by the bracket 84.

A third heating coil 112 surrounds and is insulated from the bi-metallic strip 102. A wire 114 connects one end of this coil with the battery terminal 56 and a second wire 116 connects the other end of this coil with the ground terminal 62.

The current through the coil 112 will vary with the variation in voltage of the electrical circuit in which the indicator is connected, with the result that the temperature and curvature of the bi-metallic strip 102 will vary as a function of this voltage change. Changes in curvature of the strip 102 will swing bracket 88 about its pivot and this in turn will shift strap 98, yoke 38 and pointer shaft 36. The parts are so proportioned and disposed that this shifting of the pointer shaft 36 will change the relationship between arm 34 and link 26 in a manner compensating only for such shifting of link 26 as may be due solely to variations in voltage in the electrical circuit of which my improved indicator is a part.

The bi-metallic strip 102 is also subject to variations in ambient temperature and I have provided means to compensate for the effect of ambient temperature variations on this strip 102. This I accomplish by making the strap 98 in the form of a bi-metallic strip which is so proportioned and disposed that ambient temperature variations bend the strap 98 in such direction and to such degree as to compensate for flexing of the bi-metallic strip 102 due to such temperature variations.

In order to protect the several parts of the indicator against dust, dirt and injury, I preferably provide my new and improved indicator with a metallic cover 120 which is suitably attached to the base 10 and which provides a glass face 122 through which the dial and pointer are visible.

The indicator shown in Figure 1 has a dial graduated to show the amount of gasolene in the main gasolene supply tank of an automobile. It will be understood that where my new and improved indicator is installed on an automobile, the indicator is ordinarily connected to the automobile battery 66 by way of the usual ignition switch so that the indicator is only operative during engine operation. In automotive practice the frame of the vehicle is commonly used as a ground for the electrical circuits and for such installations the grounding of the wires as indicated at 64, 68 and 82 in Figure 2 of the drawings, will be understood as indicating that the respective wires are attached to the automobile frame.

Any increase in the ambient temperature tends to produce a curvature of the bi-metallic strip 22 which would move the lower end of this strip to the left, as viewed in Figure 2. However, this same increase in ambient temperature tends to move the lower end of the bi-metallic strip 24 to the right with equal force. Both of these movements are prevented by the connecting link 26 which remains stationary because the opposing and equal forces set up in the bi-metallic strips 22 and 24 neutralize each other.

An increase in the ambient temperature likewise produces a curvature of the bi-metallic strip 102 which moves the bracket 88 about its pivot in a counter-clockwise direction. However, this same increase in ambient temperature causes a curvature of the bimetallic strip 98 which curves to maintain the same relationship between the arm 34 and link 26, thereby compensating for the bending of the bi-metallic strip 102.

The variable rheostat 80 is controlled by the usual float in the gasolene tank of the automobile and is so arranged that when the tank is empty, the full resistance of this rheostat is in series with the heating coil 70. The full resistance of the rheostat 80 is equal to the resistance 59 in series with the heating coil 54. Both heating coils 54 and 70 thus receive the same current and heat the bi-metallic strips 22 and 24 to the same temperature with a resulting tendency to bend these metallic strips equally and in opposite directions. The bending tendencies of the two strips neutralize each other and the pointer 42 remains at zero.

If an increase in the voltage of the electrical system should occur, this increased voltage would cause an increased current to flow through heating coils 54 and 70, but the resulting increased bending tendencies of the two bi-metallic strips 22 and 24 would continue to neutralize each other. This increased voltage would also cause an increased current to flow through heating coil 112, thereby increasing the temperature of the bi-metallic strip 102. This would result in a counter-clockwise movement of the bracket 88 about its pivot 92 and would move the yoke 38 and pointer shaft 36 away from link 26. This movement, however, would be in a plane either including or parallel to the contacting edge of the arm 34, so that the relationship between this arm and the link 26 would remain the same.

If now gasolene be added to the main gasolene tank of the automobile, the movable contact of the rheostat 80 will be shifted an amount proportional to the amount of gasolene put into the tank and the resistance of this rheostat will be decreased accordingly. This decrease in resistance will cause a greater current to pass through heating coil 70 with the result that the bi-metallic strip 24 will be heated to a higher temperature than the bi-metallic strip 22. The temperatures of the bi-metallic strips 22 and 24 will vary as the squares of the currents passing through the coils 54 and 70 respectively, and the increased temperature of the strip 24 will cause it to bend to a greater degree than the strip 22, thereby moving the link 26 to the right as viewed in Figure 2. This movement of the link 26 will shift arm 34 and pointer 42 so that the pointer will indicate correctly the amount of gasolene present in the tank of the automobile.

If the voltage of the automobile electrical system increases when the gasolene tank is full, the increase in current through the heating coil 70 will be greater than the increase in current through the coil 54, with the result that bi-metallic strip 24 will bend in such a way as to move the link 26 farther toward the right. However, this same increase in voltage will produce an increased current through the heating coil 112, thereby bending bi-metallic strip 102 and moving bracket 88 about its pivot in a counter-clockwise direction. This will move yoke 38 and pointer shaft 36 away from link 26. Since the arm 34 is now nearly parallel with the link 26, this movement of the pointer shaft 36 away from the link 26, will offset the increased rightward movement of link 26 due to this voltage increase. The voltage compensating means thus provides proper compensation for voltage changes in the electrical system for all readings of the indicator.

In order to obtain the utmost accuracy, the surface of the lug 110 which engages the ball 104 must be located in a plane which passes by the axis of the bearings 92 at a distance equal to half the diameter of the ball 104 and the ends of the bi-metallic strips 98 and 102 which are secured to the lugs 96 and 100 respectively must lie in planes passing through the axis of the bearings 92. Small deviations from these relationships will not materially affect the accuracy of the instrument.

I also provide the bracket 84 with a baffle 126 which prevents direct radiation between heating coils 70 and 112.

I have obtained excellent results with a gasolene gauge for automobiles which was constructed according to the showing of Figures 1 to 6 of the drawings and wherein heating coils 54, 70 and 112 each had a resistance of 50 ohms and the resistance 59 and the resistance of the rheostat 80 each had a value of 100 ohms. In this gasolene gauge the slider of the variable rheostat moved over the full range of the resistance element of this rheostat so that when the slider was in one extreme position, the full 110 ohms resistance was in the circuit, whereas when the slider was at the opposite extreme position, none of the rheostat resistance was in the circuit. It will be appreciated that this gasolene gauge is cited merely as a particular exemplification of my invention and that other values for the heating coils and resistance elements could be selected and also that it is not necessary that the slider of the rheostat move over the full range of the rheostat resistance.

Figures 7, 8:
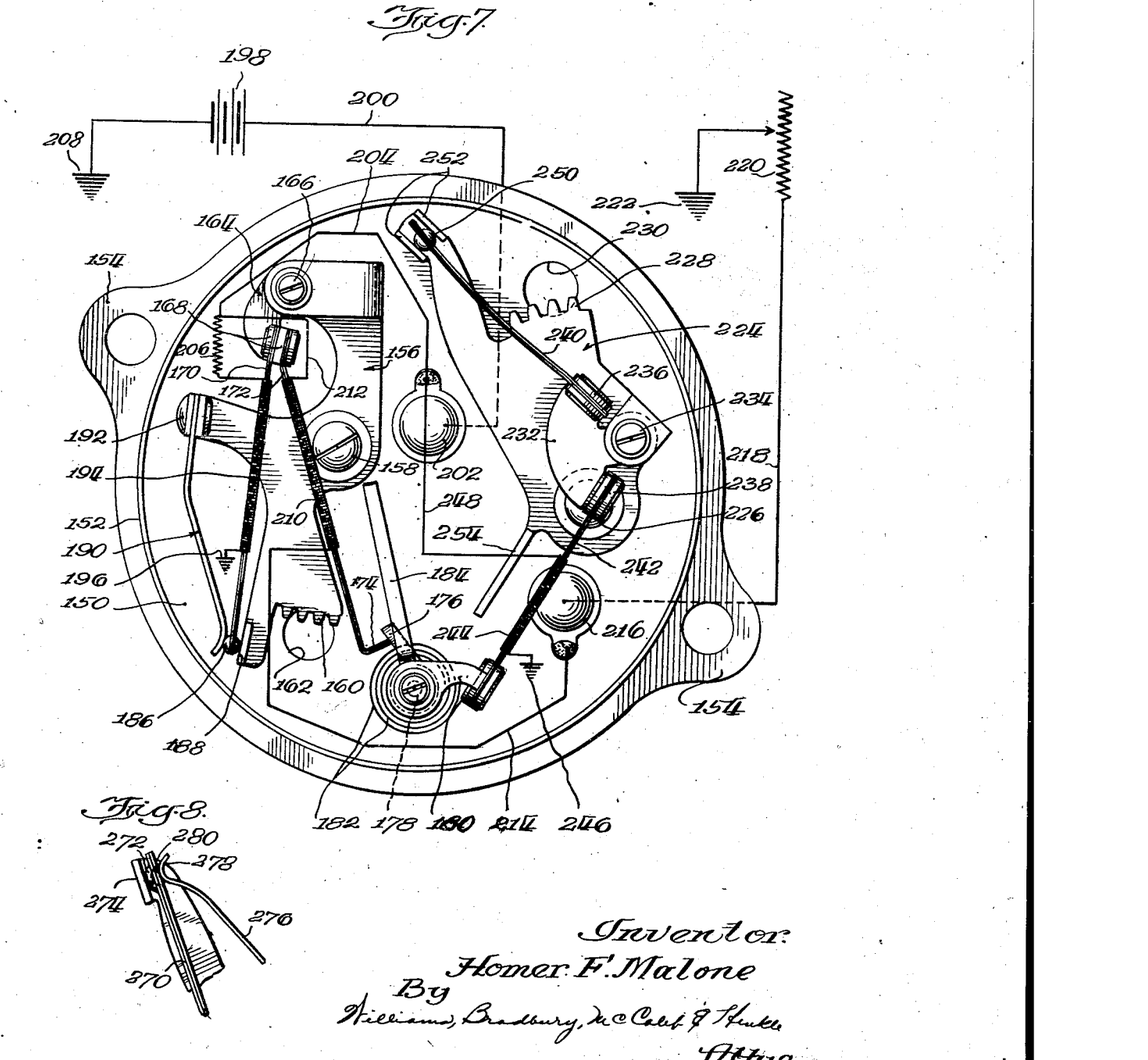
Figure 7 is a view similar to Figure 2 but showing a modified form of my invention.
Figure 8 is a detail showing a modified form of spring arrangement for the compensating mechanism.

In Figure 7 of the drawings, I have illustrated a modified form of my invention in which deflections are neutralized rather than forces. In this embodiment the operative parts of the indicator are mounted on the base portion 150 of a pressed metal cup 152 provided with ears 154 for receiving bolts or other means for securing the cup 152 to the instrument panel of an automobile or other support. It will be understood that the open end of the metal cup 152 is adapted to be closed by a glass cover secured to the metal cup by any usual and suitable means. For production purposes this enclosing means of Figure 7 is preferred over that shown in Figures 1 to 6 inclusive.

A bracket 156 is pivoted to the base 150 by a screw 158 and is clamped against the base with such force that shifting of this bracket will not result from any vibration to which the instrument may be subjected. One end of the bracket 156 is provided with teeth 160 for engagement by a tool inserted through the opening 162 whereby the bracket 156 may be adjusted about its pivot 158. A second bracket 164 is pivoted to the bracket 156 at 166 and has lugs 168 to which are secured the adjacent ends of bi-metallic strips 170 and 172. The bi-metallic strip 172 has a laterally projecting end 174 for engaging the arm 176 of pointer shaft 178 mounted in yoke 180. The arm 176 is held against the end 174 by a spiral spring 182 attached to the yoke 180. The pointer shaft 178 carries a pointer 184 which is adapted to move over the indicia provided by a suitable dial not shown. In this particular embodiment the pointer shaft 184 is not provided with a balance like the balance 52 shown in Figure 2.

The bi-metallic strip 172 is subject to variations in ambient temperature which would impair the accuracy of the instrument unless means were provided to compensate for the effect of such ambient temperature changes. The bi-metallic strip 170 accomplishes this purpose. This bi-metallic strip 170 has its remote end provided with a ball 186 which slidably engages the surface of a lug 188 formed on the bracket 156. This surface is preferably located in a plane which passes to the right of the axis of the pivot 166 at a distance equal to one-half the diameter of the ball 186 and the ends of the strips 170 and 172 which are attached to the lugs 168 preferably lie in planes which substantially intersect this axis. The ball 186 is held in engagement with the lug 188 by a spring finger 190 attached to a lug 192 formed on the bracket 156.

The arrangement of the parts thus far described is such that the bimetallic strips 170 and 172 are both exposed to the same variations in ambient temperature. The effect of these ambient temperature changes on the bi-metallic strip 170 is to bend the upper end of this strip to the left or right, as viewed in Figure 7, depending upon the nature of any particular temperature change, and thereby swing bracket 164 about its pivot 166. This pivotal movement of the bracket 164 swings the upper end of bi-metallic strip 172 and exactly compensates for the bending of the bi-metallic strip 172 due to this same temperature change. The result is that ambient temperature changes have no effect on the relationship between the end 174 of the bi-metallic strip 172 and the arm 176 of the pointer shaft.

The bi-metallic strip 170 is provided with a heating coil 194 which corresponds to the heating coil 54 of the previous embodiment. This heating coil 194 has its lower end grounded to the bi-metallic strip 170 as diagrammatically indicated at 196. The other end of this coil is connected to one terminal of the battery 198 through wire 200, terminal 202, wire 204 and resistance 206. The other terminal of the battery is grounded as indicated at 208.

A second heating coil 210 is provided for the bi-metallic strip 172. This heating coil 210 has its upper end connected to the battery 198 by way of wire 200, terminal 202, wire 204 and wire 212. A wire 214 connects the other end of this coil 210 to a terminal 216 and a wire 218 connects this terminal to a variable rheostat 220 which is grounded at 222. It will be understood that the terminals 202 and 216 are insulated in the usual manner from the metal case 152.

Where the voltage of the circuit of which my indicator forms a part is maintained constant, the yoke 180 may be attached directly to the base 150 by any usual means. However, where the voltage of the circuit varies, it is desirable to provide means for compensating for the effect of this variable voltage. This voltage compensating means may be of the kind illustrated in the embodiment of Figures 1 to 6. In this Figure 7 however I have shown a modified form of voltage compensating means which may be used interchangeably with that shown in the previous embodiment.

In this Figure 7 a bracket 224 is pivoted at 226 to the base 150 and is provided with adjusting teeth 228 which are accessible through an opening 230. A swinging bracket 232 is pivoted at 234 to the bracket 224 and has angularly disposed lugs 236 and 238 for carrying the adjacent ends of bi-metallic strips 240 and 242 respectively. These lugs 236 and 238 are preferably so disposed that the attached ends of the bi-metallic strips lie in planes which intersect the axis of the pivot 234.

The bi-metallic strip 242 carries the yoke 180 and is provided with a heating coil 244 whose lower end is grounded to the bi-metallic strip 242 as indicated diagrammatically at 246. A wire 248 connects the other end of this heating coil 242 to the terminal 202 which in turn is connected to the battery 198.

The heating effect of the coil 244 varies with the current flowing therethrough, which in turn varies with the voltage of the battery 198 or other source of electro-motive force for operating the indicator. This variation in the heating effect of the coil 244 creates a variation in curvature of the bi-metallic strip 242 which shifts the relationship between the arm 176 of the pointer shaft and the end 174 of the bi-metallic strip 172 in a manner similar to that described in the previous embodiment, whereby the effect of voltage variation on the instrument is completely compensated for.

Since the bi-metallic strip 244 is also subject to the effect of ambient temperature variations, I have provided means to compensate for the effect of such ambient temperature variations on this bi-metallic strip 242. The bi-metallic strip 240 has its upper end provided with a ball 250 which slides in the channel provided by upstanding lugs 252 formed from the metal of the bracket 224. The longitudinal center of this channel lies in a plane preferably passing through the axis of the pivot 234. This bi-metallic strip 240 is subjected to the same ambient temperature changes as the bi-metallic strip 242 and these temperature changes produce a bending of the bi-metallic strip 240 which swings the bracket 232 about its pivot 234 in such direction and to such degree as to compensate exactly for the effect of such ambient temperature changes on the bi-metallic strip 242.

As a further means of insuring accuracy of the instrument, I preferably provide the bracket 224 with a baffle 254 which prevents direct radiation between coils 244 and 210.

Since the mode of operation of the embodiment shown in Figure 7 is generally the same as that of the first embodiment, it is believed to be unnecessary to describe in further detail the operation of the embodiment of Figure 7. It will suffice to point out that in the embodiment of Figure 7 the forces created by the bending of the bi-metallic strips 170 and 172 are not opposed, but these strips are so arranged and coordinated that the resulting deflections are neutralized. This second embodiment has the advantage of requiring less power input for its operation.

The voltage variation compensating means of Figure 7 differs from that of Figure 2 primarily in the reversal of the high and low expanding sides of the bi-metallic strips and the location of the heating coil on the bi-metallic strip which supports the yoke which carries the pointer shaft. A further difference lies in the elimination of the spring 106 of Figure 2 and the substitution therefor of a second upstanding lug for engaging the opposite side of the ball on the end of the bi-metallic strip which controls the movement of the pivoted bracket.

In Figure 8 I have shown a further variation of the means for holding the sliding end of a bi-metallic strip against its guiding lug. In this figure the bi-metallic strip 270 has a punched out portion 272 forming a semi-spherical projection for engaging the contact face of a guiding lug 274. A spring finger 276 has an arcuate portion 278 which engages the bi-metallic strip 270 directly behind this projection 272, it being understood that the arcuate portion 278 is sufficiently broad in a plane perpendicular to the paper, to span the depression 280 formed in making the projection 272. It is important to note that the end 278 of the spring finger engages the bi-metallic strip directly back of the projection 272, whereby this projection is pressed directly against the guiding lug 274 and there is no force created by the spring 276 tending to pivot the bi-metallic strip 270 about the projection 272 as a fulcrum.

Figure 9:
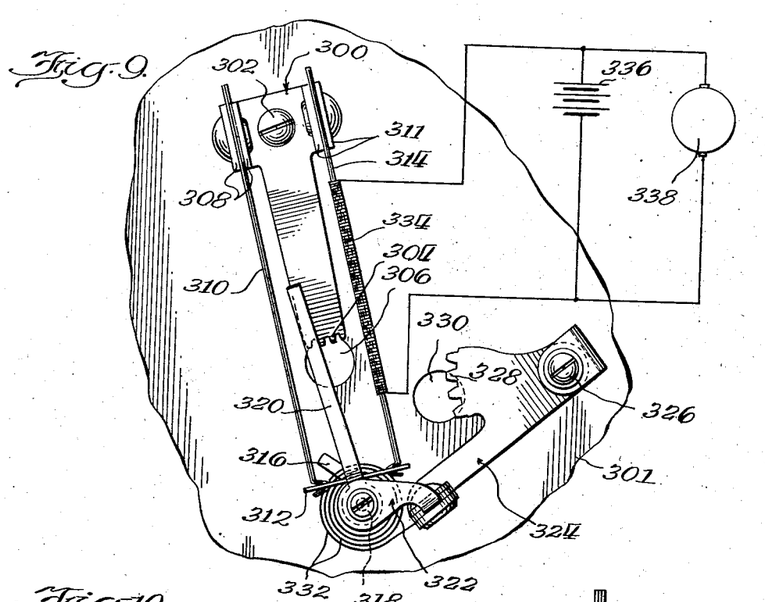
Figure 9 shows a voltage indicator embodying various features of my invention.

In Figure 9 of the drawings I have illustrated a voltage indicator embodying various features of my invention. In this Figure the bracket 300 is pivoted at 302 to any suitable support 301 and is provided with adjusting fingers 304 accessible through an opening 306. The bracket 300 has lugs 308 for supporting one end of a bimetallic strip 310 having its opposite end attached to a metal link 312.

A second set of lugs 311 formed from the bracket 300 carries one end of a second bi-metallic strip 314 having its other end connected to the link 312. The bi-metallic strips 310 and 314 are so arranged and proportioned that ambient temperature changes cause the lower ends of these strips to tend to move in opposite directions and with equal force and such movements and forces are neutralized by the link 312.

The link 312 has an opening providing an edge for engaging the arm 316 of a pointer shaft 318 carrying a pointer 320 for cooperating with a dial carrying suitable indicia.

The pointer shaft 318 is supported in a yoke 322 mounted on a bracket 324 which is pivotally secured at 326 to the support 301. This bracket 324 is provided with adjusting teeth 328 accessible through an opening 330. A spiral spring 332 holds the arm 316 against one edge of the slot in the link 312.

A heating coil 334 is provided for the bi-metallic strip 314 and is connected across a battery 336 and generator 338 which may be considered as representing the battery and generator of an automobile electrical system.

In my improved voltage indicator, variations in voltage of the automobile electrical system cause variations in current through the heating coil 334, whereby the bi-metallic strip 314 is heated to different temperatures corresponding to these different voltages. The heating effect of the coil 334 on the bi-metallic strip 314 causes the lower end of this strip to move to the right, as viewed in Figure 9 of the drawings, thereby swinging arm 316 and pointer 320 to the right an amount corresponding to the voltage in the electrical system. My improved voltage indicator is perfectly compensated for ambient temperature changes, is extremely accurate, may be easily calibrated, and is simple and inexpensive to manufacture.

In the embodiments thus far described, a spiral spring has been utilized to move the pointer toward one limit of its travel. For certain purposes it may be desirable to eliminate this spring and in Figure 10 of the drawings I have shown a structure in which this spring is eliminated. In this structure the bi-metallic strips 350 and 352 may be considered as corresponding to the bi-metallic strips 22 and 24 respectively of Figure 2. The lower ends of the bi-metallic strips 350 and 352 are connected by a link 354 having a downwardly extending lug 356 provided with a pin 358 which slides in the slot 360 provided in arm 362 of the pointer shaft 364 carrying the pointer 366.

Figure 10:
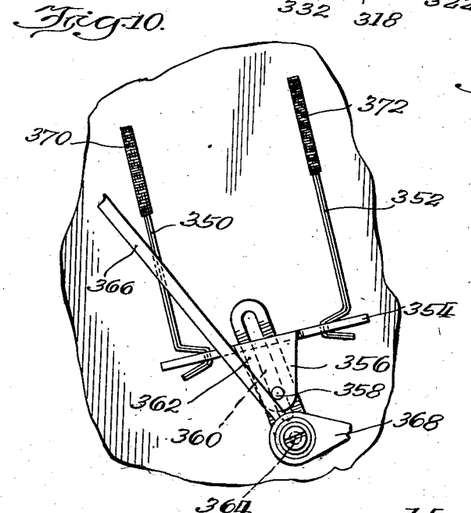
Figure 10 is a detail showing a modified drive for the pointer shaft.

In the structure of this Figure 10 the link 354 moves the pointer 366 in both directions. It will be understood that the pointer shaft 364 is carried in a yoke 368 which may be either attached to a bi-metallic strip as in Figures 2 and 7, or to a bracket as in Figure 9. Movement of the link 354 is determined by the relative heating effect of the coils 370 and 372 associated with the bi-metallic strips 350 and 352 respectively.

Figure 11:
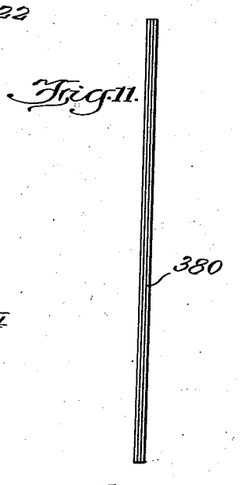
Figure 11 is a view showing a tri-metallic strip.

In Figure 11 I have shown a tri-metallic strip 380 which has the same warping or bending characteristics due to temperature changes that are possessed by the more common bi-metallic strip heretofore referred to. This tri-metallic strip 380 may be used in lieu of the bi-metallic strips described in connection with the embodiments of Figures 1 to 10 inclusive. In fact it is immaterial whether these strips which bend or warp with variations in temperature be made of two, three, or more metal bands secured together, and in the claims I have therefore referred to all strips of this character as thermo-strips.

It is to be understood that the expression "changes in ambient temperature" is used to refer to changes in the temperature of the indicator resulting from changes in atmospheric temperature and from the local heating effects resulting from the proximity of a hot engine, exhaust pipe, automobile heater, etc.

While I have designed an indicator which is particularly advantageous for use in locations where the ambient temperature changes, my invention is not necessarily limited to such use, but may be used in locations where no ambient temperature fluctuation exists. Where an indicator is desired for a location in which the ambient temperature is constant, it may be found desirable to simplify and cheapen the instrument by removing the means for compensating for ambient temperature changes. For example, in the embodiment of Figure 7, the means for compensating for ambient temperature changes could be removed as by removing bi-metallic strips 194 and 240, spring 190, and tightening up the pivotal mountings of the movable brackets 164 and 232, whereby these movable brackets become rigid with brackets 156 and 224 respectively. It will of course be understood that if an indicator like that shown in Figure 7 were being designed solely for use in locations where the ambient temperature remains constant, further simplification could be effected by eliminating the movable brackets 164 and 232, changing and simplifying the design of the brackets 156 and 224 and mounting the bi-metallic strips 210 and 242 directly on the brackets 156 and 224 respectively.

While I have illustrated only a few embodiments of my invention, it is to be understood that my invention is capable of assuming numerous forms and that the scope of my invention is to be limited solely by the following claims.

I claim:

1. In an indicator of the class described, the combination of a bracket, a pivotal support for said bracket, a pair of opposed thermo-strips carried by said bracket, a link connecting the free ends of said strips, a heating coil associated with each strip, a pointer, a pointer shaft, a movable support for said shaft, an operative connection between said link and said shaft, a third thermo-strip, a heating coil associated with said last-named strip, a pivoted bracket connected to and moved by said last-named strip and a fourth thermo-strip mounted on said pivoted bracket, said fourth thermo-strip carrying said support for the pointer shaft.

2. In an indicator of the class described, the combination of a pair of opposed thermo-strips, a heating coil associated with each strip, means responsive to a condition to be indicated for varying the current supplied to one of said coils, a link connected to an end of each of said strips, a pointer shaft, a pointer carried by said shaft, an arm attached to said shaft, and engaging said link, a spring for holding said arm in engagement with said link, and means responsive to voltage variations in a circuit including said coils for shifting said pointer shaft relative to said link.

3. In an indicator of the class described, the combination of a support, a pair of thermo-strips carried by said support and co-acting to compensate for ambient temperature variations, a heating coil associated with each strip, said coils being adapted to be connected to a common source of electro-motive force, means for varying the current supplied to one of said coils, a pointer jointly controlled by said strips, and means responsive to variations in voltage of said source of electro-motive force for changing the locational relationship between said pointer and said thermo-strips, said last-named means including a pair of thermo-strips arranged at substantially right angles to each other and co-acting to compensate for ambient temperature variations and a heating coil associated with one of said last-named thermo-strips and adapted to be connected to said common source of electromotive force.

4. In an indicator of the class described, the combination of a dial, a pointer movable over said dial, a pointer shaft, a member providing bearings for said shaft, means including a pair of thermo-strips for rotating said shaft, a heating coil associated with each of said thermo-strips, voltage compensating mechanisms for moving said shaft relative to its rotating means, said mechanism comprising a pair of thermo-strips and a heating coil associated with one of said strips, each pair of thermo-strips being arranged to form a unit automatically compensating for the effect of ambient temperature changes thereon, and means for connecting all of said heating coils with a common source of variable voltage.

5. In an indicator of the class described, the combination of a dial, a pointer movable over said dial, a pointer shaft, a member providing bearings for said shaft, means for rotating said shaft, and mechanism for moving said shaft relative to its rotating means, said mechanism comprising a thermo-strip, a movable bracket supporting said strip, a second thermo-strip connected to said bracket, a stationary part engaged by said second thermo-strip, and a spring for holding said last-named strip in engagement with said part.

6. In an indicator of the class described, the combination of a dial, a pointer movable over said dial, a pointer shaft, a member providing bearings for said shaft, means for rotating said shaft, and mechanism for moving said shaft relative to its rotating means, said mechanism including a support, a bracket shiftable on said support, a movable bracket carried by said first-named bracket, a pair of thermo-strips carried by said movable bracket, one of said thermo-strips being connected to said member, a heating coil associated with the other thermo-strip, a guide for said last-named strip, said guide being provided by said adjustable bracket and a spring for holding said strip in contact with said guide.

7. In an indicator of the class described, the combination of a pair of opposed thermo-strips, a heating coil associated with each strip, means responsive to a condition to be indicated for varying the current supplied to one of said coils, a link connected to an end of each of said strips, a pointer shaft, a pointer carried by said shaft, an arm attached to said shaft, and a pin and slot connection between said arm and said link.

8. In an indicator of the class described, the combination of a base, a bracket mounted thereon, means for adjusting said bracket relative to said base, a second bracket pivoted on said first-named bracket, temperature responsive means carried by said pivoted bracket, indicating means operated by said temperature responsive means, means for varying the temperature of said temperature responsive means, and means for shifting said pivoted bracket to compensate for the effect of ambient temperature changes on said temperature responsive means.

9. In an indicator of the class described, the combination of indicating means, electrically operated means for driving said indicating means, said electrically operated means being adversely affected by voltage variation in a circuit in which it is connected, and voltage compensating means including a thermo-strip supporting said indicating means, and a heating coil for said thermo-strip, said heating coil being subjected to the voltage variations of said circuit.

10. In an indicator of the class described, the combination of indicating means, electrically operated means for driving said indicating means, said electrically operated means being adversely affected by voltage variations, voltage compensating means including a thermo-strip forming a support for said indicating means, a pivoted bracket carrying said thermo-strip, a second thermo-strip attached to said bracket, fixed guiding means including a pair of surfaces contacting opposite sides of one end of said last-named strip, and a heating coil for one of said thermo-strips.

11. In mechanism of the class described, the combination of a thermo-strip, heating means associated therewith, means operated by said thermo-strip, a compensating thermo-strip, a bracket attached to both thermo-strips and movable under the influence of said last-named thermo-strip, said last-named thermo-strip having a projection at one end thereof, means providing a guiding surface for said projection, and a spring engaging said last-named thermo-strip at a point opposite said projection and urging said projection toward said guiding surface.

12. In an indicator of the class described, the combination of a thermo-strip, a heating coil associated therewith, indicating means operated by said thermo-strip, a second thermo-strip providing a mounting for said indicating means, a separate support for each thermo-strip, and a second heating coil associated with said second thermo-strip to vary the locational relationship between said indicating means and said first-mentioned thermo-strip.

13. A thermal type indicator of the class described comprising indicating means including a scale and a pointer movable relative thereto, a temperature responsive unit including an electrical heating means for creating relative movement between said scale and pointer, variable driving means including relatively movable members connecting said temperature responsive unit with said indicating means, and a second temperature responsive unit including an electrical heating means, said second temperature responsive unit acting solely by creating movement between the relatively movable members of the variable driving means to compensate for the effect of voltage variations on said first mentioned temperature responsive unit.

14. A thermal type indicator of the class described comprising indicating means including a scale and a pointer movable relative thereto, a temperature responsive unit including an electrical heating means for creating relative movement between said scale and pointer, variable driving means including relatively movable members connecting said temperature responsive unit with said indicating means, and a second temperature responsive unit including an electrical heating means, said second temperature responsive unit acting solely by creating movement between the relatively movable members of the variable driving means to compensate for the effect of voltage variations on said first mentioned temperature responsive unit, said temperature responsive units being so arranged and constructed that no relative movement between said scale and pointer results from variations in ambient temperature.

15. A thermal type indicator of the class described comprising a scale, a pointer movable relative thereto, a pivotal mounting for said pointer, an arm for moving said pointer about its pivotal mounting, a first temperature responsive unit having a part engaging said arm, said temperature responsive unit including electrical heating means, a movable bracket carrying said pivotal mounting, a second temperature responsive unit including an electrical heating means, said second temperature responsive unit effective to shift said bracket and thereby vary the position of the contact between said arm and said first mentioned temperature responsive unit to compensate throughout the range of movement of said pointer for the effect of voltage variation on said first temperature responsive unit.

16. A thermal type ohmmeter of the class described comprising a scale, a pointer movable relative thereto, a pivotal mounting for said pointer, an arm for moving said pointer about its pivotal mounting, a first temperature responsive unit having a part engaging said arm, said temperature responsive unit including electrical heating means, a movable bracket carrying said pivotal mounting, a second temperature responsive unit including an electrical heating means, said second temperature responsive unit effective to shift said bracket and thereby vary the position of the contact between said arm and said first mentioned temperature responsive unit to compensate throughout the range of movement of said pointer for the effect of voltage variation on said first temperature responsive unit, said temperature responsive units being so constructed and arranged that the position of said pointer with respect to said scale is not affected by variations in ambient temperature, and a pivotally adjustable bracket carrying one of said temperature responsive units.

17. A thermal type ohmmeter of the class described comprising a scale, a pointer movable relative thereto, a pivotal mounting for said pointer, an arm for moving said pointer about its pivotal mounting, a first temperature responsive unit having a part engaging said arm, said temperature responsive unit including electrical heating means, a movable bracket carrying said pivotal mounting, a second temperature responsive unit including an electrical heating means, said second temperature responsive unit effective to shift said bracket and thereby vary the position of the contact between said arm and said first mentioned temperature responsive unit to compensate throughout the range of movement of said pointer for the effect of voltage variation on said first temperature responsive unit, said temperature responsive units being so constructed and arranged that the position of said pointer with respect to said scale is not affected by variations in ambient temperature, and a pivotally adjustable bracket carrying each of said temperature responsive units.

HOMER F. MALONE.